United States Patent Office 3,644,297
Patented Feb. 22, 1972

3,644,297
NOVEL HIGH TEMPERATURE RESISTANT RESIN HAVING N-ALKYLHYDRAZIDE UNITS AND A METHOD OF PRODUCING THEREOF
Hideo Sekiguchi, Yokohama, and Kazuo Sadamitsu, Tokyo, Japan, assignors to The Furukawa Electric Company Limited, Chiyoda-ku, Tokyo, Japan
No Drawing. Filed Dec. 30, 1968, Ser. No. 788,060
Claims priority, application Japan, Jan. 22, 1968, 43/3,379, 43/3,380
Int. Cl. C08g 20/20
U.S. Cl. 260—78 R    21 Claims

ABSTRACT OF THE DISCLOSURE

Novel high temperature resistant resin having N-alkylhydrazide units whose alkyl group has 2 to 4 carbon atoms, is prepared by reacting polyoxadiazole with alkyl sulfate whose alkyl group has 2 to 4 carbon atoms in concentrated sulfuric acid. Thus obtained resin is fusible and soluble or insoluble in organic solvents and can be converted into polyoxadiazole again by heat-treatment which has higher temperature resistance.

---

The present invention relates to novel high temperature resistant resins having N-alkylhydrazide units, which are fusible and soluble or insoluble in organic solvents, a production method thereof, a method of converting the said resin into oxadiazole resin, and resin products made from above-mentioned resins.

Recently, polyoxadiazole resin has been developed as a resin having a high heat resistance, but said resin has neither melting point nor softening point and is not soluble in organic solvents, so that it is not usable.

Heretofore, as a method for utilizing such a resin, which is resistant to high temperature but has the above described drawbacks, a process has been proposed in which an intermediate product soluble in organic solvents is firstly formed, and during or after such forming step, said intermediate product is subjected to a cyclodehydration by chemical or thermal treatment, whereby said intermediate product is converted into a resin having a higher heat resistance.

As to polyoxadiazole, U.S. Pat. No. 3,238,183 discloses that polyhydrazide is formed as an intermediate product and then cyclodehydrated by heating to be converted into polyoxadiazole resin. However, it is difficult to dissolve the polyhydrazide in organic solvents and also to convert the polyhydrazide into oxadiazole by the cyclodehydration, so that such a process has not been put to commercial use.

In regard to improvement of the solubility of polyhydrazide in organic solvents, there is Japanese Pat. No. 535,358 in which poly(N-methylhydrazide) is made by reacting aromatic dicarboxylic acid dimethylester and hydrazines in polyphosphoric acid or oleum. But it was found that poly(N-methylhydrazide) is certainly more soluble than polyhydrazide, but that the resin has more difficulty in thermal cyclization reaction into polyoxadiazole.

Therefore, poly(N-methylhydrazide) is not so easy to come into the market.

An object of the present invention is to overcome these defects of the known polyoxadiazole precursor and to provide novel resins having N-alkylhydrazide units which are fusible, soluble or insoluble in organic solvents and excellent in heat resistance and can be converted into polyoxadiazole.

Another object of the present invention is to provide a method of producing the said novel resin having such properties.

A further object of the present invention is to provide useful resin products and insulated electric wires having excellent heat resistance and mechanical and electrical properties by casting or baking a solution of the said resin in an organic solvent, with or without effecting further heat-treatment at a temperature higher than the casting or baking temperature.

Noticing the excellent heat resistance of the polyoxadiazole resin, the inventors have made various studies on a method of turning it into an easily usable resin and found that the said resin having N-alkylhydrazide structural unit having the general formula

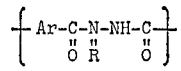

wherein Ar is bivalent aromatic radical, and R is alkyl group having 2 to 4 carbon atoms, is fusible and soluble or insoluble in organic solvents and has excellent heat resistance and mechanical and electrical properties.

Furthermore, it has been found that the said resin can be produced by reacting polyoxadiazole having the following repeated unit

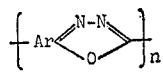

wherein Ar is bivalent aromatic radical and n is a polymerization degree expressed by integer and corresponding to an inherent viscosity of more than 0.3 in 0.5% solution in concentrated sulfuric acid at 30° C., with mono- or dialkyl sulfate whose alkyl group has 2 to 4 carbon atoms (hereinafter called "the alkyl sulfates") in a concentrated or fuming sulfuric acid (hereinafter called "the sulfuric acid").

The reaction producing the N-alkylhydrazide structural unit is as follows:

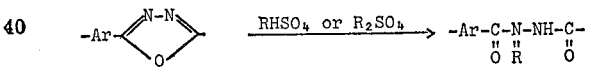

Surprisingly, such resins are fusible and some of them are very readily soluble in organic polar solvents, such as inexpensive phenol, cresol and xylenol in addition to N,N-dimethylformamide, N,N-dimethylacetamide, N-methylpyrrolidone and dimethylsulfoxide dichloroacetic acid, or a mixture of these solvents as the main component and non-solvents such as solvent naphtha, xylene, toluene, acetone and so on, and the resulting solutions can be cast or baked into resin products and electric wire insulation having various highly useful properties such as heat resistance and mechanical and electrical properties.

It has been found that when the above described resin is heated at a temperature of 200° C. to 600° C., alkyl group is separated from it, and the oxadiazole ring is again formed so that the resulting resin has a higher heat resistance.

The reaction cyclizing the N-alkylhydrazide structural unit into oxadiazole unit is as follows:

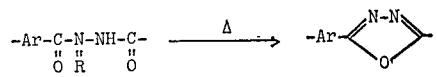

Polyoxadiazole to be used in the present invention can be produced by the following known processes.

(1) J. Polymer Sci., A3, 45 (1965) discloses that said polyoxadiazole is produced by reacting aromatic dibasic acid or the derivatives thereof with hydrazine or a salt thereof in fuming sulfuric acid or polyphosphoric acid.

(2) U.S. Pat. No. 3,238,183 discloses that an aromatic dibasic acid dihydrazide is reacted with an aromatic diacid halide in the presence of acid acceptor to produce polyhydrazide, which is converted into oxadiazole by heating.

(3) Makromol. Chem., 44–6, 388 (1961) discloses that bistetrazole derived from aromatic dibasic acid is reacted with aromatic dibasic acid halide in the presence of acid acceptor to produce polyoxadiazole.

The above described aromatic dibasic acid includes, for example, terephthalic acid, isophthalic acid, 4,4'-dicarboxydiphenyl, 4,4'-dicarboxydiphenyl ether, 3,4'-dicarboxydiphenyl ether, 4,4'-dicarboxydiphenyl sulfide, 4,4'-dicarboxydiphenyl sulfone, 2,2'-bis(p-carboxyphenyl)5,5'-bibenzimidazole, 2,2' - bis(p-carboxyphenyl)5,5'-bibenzoxazole, 2,2' - bis(p-carboxyphenyl)5,5'-bibenzthiazole, 2,5 - bis(p-carboxyphenyl)1,3,4-thiadiazole, etc. The derivatives of these dibasic acids include alkyl ester of alcohols having 2 to 4 carbon atoms, for example, diethyl terephthalate, diisopropyl terephthalate, dibutyl terephthalate, diethyl isophthalate; amide such as terephthalamide, isophthalamide, etc.; dihydrazide such as terephthalic acid dihydrazide, isophthalic acid dihydrazide, etc.; and nitrile such as terephthalonitrile, isophthalonitrile, etc.

It is preferable that polyoxadiazole to be used in the present invention has para- or meta-phenylene structural unit and is produced by the above described known process (1). Namely, the dibasic acid is reacted with hydrazine (the hydrazine is used in 2 mol percent to 20 mol percent in excess over dibasic acid) in the presence of fuming sulfuric acid containing sulfuric anhydride corresponding in amount to at least 4 times the mole of the dibasic acid component at a temperature of 90° C. to 160° C.

The molecular weight of the polyoxadiazole to be used in the present invention is not particularly limited, but must preferably be high enough to give it practically useful properties. Accordingly, the resin having a practically useful molecular weight is the one having an inherent viscosity of more than 0.3 in 0.5% resin solution in concentrated sulfuric acid at 30° C.

According to the present invention, in order to produce the said resin, namely, poly(N-alkylhydrazide) or copolymeric resin consisting of a N-alkylhydrazide structural unit and an oxadiazole structural unit from the polyoxadiazole, said polyoxadiazole is reacted with the above described alkyl sulfates in the sulfuric acid, the alkyl sulfates being added in such an amount that the alkyl groups in said sulfate are not less than 0.2 mole against 1 mole of the aromatic residue in the polyoxadiazole.

The reason why the amount of the alkyl sulfates present in the reaction system is limited as described above, is that if it is less than the specified lower limit, the resin obtained in the synthetic reaction will be too small in the amount of N-alkylhydrazide unit in the molecule, so that said resin is infusible and insoluble in organic solvents.

When the amount of N-alkylhydrazide unit in the said resin increases, its softening point decreases and its solubility in organic solvent is enhanced, namely, the structural component ratio of N-alkylhydrazide unit in the said resin molecules is important.

In the case of above mentioned ratio being less than 10 mol percent, the said resin does not soften at any temperature so that it has difficulty of application, but in the case of the ratio being more than 10 mol percent to less than 40 mol percent, the resin has a softening point but is insoluble in organic solvents so that this kind of resin can be fabricated by molding process, furthermore, the said resin having the ratio being not less than 40 mol percent, is not only fusible but also soluble in organic solvents, so that this is used for many applications where high temperature resistant resin is required.

The molecular weight of the said resin obtained in the present invention is not particularly limited, but it must preferably be high enough to give it practically useful properties. Accordingly, the resin having a practically useful molecular weight is the one having an inherent viscosity of more than 0.3 in 0.5% resin solution in organic solvents such as m-cresol, N-methylpyrrolidone, N,N-dimethylformamide at 30° C. or of more than 0.01 in 0.5% resin solution in 95% concentrated sulfuric acid at 30° C.

The concentration of the sulfuric acid to be used in the present invention is not lower than 80% equivalent, because when it is lower than 80%, the polyoxadiazole and the produced polymer do not form a homogeneous solution or further a side reaction of hydrolysis of the resin occurs, so that such a concentration is not desirable. On the other hand, when the concentration of the sulfuric acid is too high, the reaction system is solid at room temperature, and therefore it is difficult to handle, and moreover anhydrous sulfuric acid has poisonous effect on this reaction, so that too high concentration of the sulfuric acid is not desirable. Accordingly, the concentration of the sulfuric acid is preferably within the range of 80% to about 100% by weight, more particularly 90% to 100% by weight.

The reaction in the method of the invention can be made at near room temperature to a high temperature, but if the temperature is too low, the reaction does not proceed or takes a long time, while if the temperature is too high, side reactions, namely, decomposition of the resin and elimination of alkyl group from produced resin are caused, so that the temperature must be 10° to 80° C., more particularly, 15° to 70° C.

The reaction time in the method of the invention is interrelated to the reaction rate of the alkyl sulfates to be added. Therefore, the resins having the same amount of N-alkylhydrazide units are produced either by prolonging reaction time and using a smaller amount of the alkyl sulfate or by shortening reaction time and using a larger amount of the said sulfate.

In the method of the present invention instead of direct addition of the alkyl sulfates to the reaction system, a substance may be added to attain the same purpose which can react with sulfuric acid in the reaction system to form an alkyl sulfate.

The "substance which can react with sulfuric acid to form an alkyl sulfate" above referred to means, for example, alcohols such as ethanol, n-propanol, iso-propanol, n-butanol, tertiary butanol, olefins such as ethylene, propylene, butylene, ethers such as ethyl ether, iso-propyl ether, alkyl halides such as ethyl chloride, n-propyl chloride, iso-propyl chloride, iso-propyl bromide, alkylesters, etc.

In this invention, alkyl groups of N-alkylhydrazide units having 2 to 4 carbon atoms has great influence over thermal cyclization reaction into oxadiazole. For example, N-ethylhydrazide, N-isopropylhydrazide unit and, for comparison N-methylhydrazide and unsubstituted hydrazide unit begins to split off the alkyl groups and convert into oxadiazole units at a temperature 180°, 150°, 330°, and 250° respectively by thermogravimetric analysis.

Therefore, most desirable alkyl groups in this invention is n-propyl and iso-propyl groups in technical and economical viewpoint.

The infrared absorption spectrum of the resin produced in the invention shows absorptions of NH groups of 3,260 cm.$^{-1}$, Co group of 1,660 cm.$^{-1}$, $CH_3$ group of 2,960 cm.$^{-1}$, and other unclear peaks, which are not found in the polyoxadiazole of the starting material, and the introduction of N-alkylhydrazide unit has been confirmed.

As mentioned above, the said resins containing N-alkylhydrazide unit, which are produced in the present invention, cause separation of alkyl group by heating these resins at a temperature of 200° C. to 600° C. and cyclize into polyoxadiazole, whereby the original polyoxadiazole is regenerated.

Accordingly, the resins, as such, can be used as useful materials having a high heat resistance and excellent mechanical, electrical and chemical properties, but if materials having a higher heat resistance are required, such materials can be obtained by heating the said resins, at the higher temperature as described above and converting them into polyoxadiazole.

In the above described heat treatment of the resulting resin, as the result of gas chromatography the separation of alkyl group can be observed at a temperature not lower than 150° C., practically not lower than 200° C. At a temperature lower than 150° C. alkyl group is not separated, so that it is necessary to effect the heat treatment at a temperature not lower than 200° C. in practical process. On the other hand, in thermogravimetric analysis, if the heat treatment is effected at a temperature higher than 600° C., a thermal breakage of the main chain of said resin molecule occurs noticeably, besides the separation of alkyl group, and such a high temperature is not desirable. Accordingly, the temperature in said heat treatment is preferably within the range of 200° C. to 600° C.

In order to form the said resins containing N-alkyl-hydrazide units obtained by the present invention into useful shaped articles, a solution of the said resin in organic polar solvents, such as, N-methylpyrrolidone, N,N - dimethylacetamide, N,N - dimethylformamide, dimethylsulfoxide, m-cresol, cresylic acid, phenol, or mixtures of said solvents and nonsolvents such as xylene, toluene, solvent naphtha, acetone, etc. is used as dope, which is formed into a proper shape and then the solvents are removed. In order to convert the said resin into polyoxadiazole the resin products can be formed by heating at a temperature not lower than 200° C. in the drying process or by heating further at said temperature after heating at a temperature lower than 200° C.

In some cases, the resin products can be formed directly by compression molding techniques, instead of using organic solvents. Resin film can be formed by spreading the resin solution over a base plate, preferably preheating at a temperature lower than 200° C. for less than 1 hour, stripping the film from the base plate, and then drying said film completely at a temperature higher than 200° C. In this case, the film can be further improved in properties by adding a drawing step in the secondary drying.

Resin impregnated cloth can be made by impregnating a base fabric with the said resin solution and then treating the impregnated fabric under the same drying condition as for the above described film. It can also be made by other usual drying process.

The formation of coating film by using said resin solution as a baking varnish, particularly insulating varnish, may be effected by coating the said resin solution, for instance on electrical conductor and then baking at a temperature of 200° C. to 500° C.

In cases of producing laminates of various materials, such as metals, inorganic or organic materials by using the said resin solution as an adhesive, said resin solution is coated on the surfaces to be bonded of said materials and heated at a temperature lower than 200° C. to form resin layers and then surfaces coated with the resin layers are put together and compressed at a temperature of 100° C. to 400° C. under a pressure of about 10 to 30 kg./cm.$^2$ mechanically or through a medium, such as, gas or liquid.

The materials, which can be laminated by the above described means, include metals, such as aluminium, copper, stainless steel, iron, titanium, etc.; inorganic materials, such as porcelains, glass cloths, asbesto plates, etc.; and organic material, such as plastics, wood, paper, cloths, etc.

Furthermore, the laminates can be produced by interposing a resin film previously produced from the resin solution at a temperature lower than 200° C., between the surfaces to be bonded of the materials and then compressing said materials in the same manner as described above. Moreover, in this case, instead of the said resin film, glass paper or cloths impregnated with the said resin can be used. In bonding the materials as described above, it is preferable that the surface to be bonded is previously cleaned or subjected to other proper treatment for easy bonding.

Furthermore, it is possible to obtain foams from the resin of this invention by the following process. The resin is primarily formed into a sheet, board, or material of any other desired shapes, and the shaped resin is heated at a temperature higher thas 200° C., preferably, 250° C. to 350° C. under atmospheric pressure, mechanical pressure, or gas or liquid pressure or in substantially pressed state in which said shaped resin is interposed between two bodies which are strong against deformation, whereby alkyl group and thermally decomposed products are split and the resin is primarily softened thermally to turn into a foam having fine cells. In this case, of course, blowing agent can be compounded with said resin before heating.

As mentioned above, the resin according to the present invention can be widely used for such resin products as films, impregnated materials, varnishes, filaments, molded articles, foams, etc.

The invention will be further explained in detail by the following examples. "Parts" and "percent" for expressing the concentration, referred to in the examples, means part(s) by weight and percent by weight except for the case with special explanation.

EXAMPLE 1

332 parts of terephthalic acid, 273 parts of hydrazine sulfate and 3,300 parts of fuming sulfuric acid containing 30% $SO_3$ (106% $H_2SO_4$) were charged into a reaction vessel, and the resulting mixture was reacted at 90° C. for 2 hours and further at 130° C for 5 hours to obtain a solution of polyoxadiazole in fuming sulfuric acid The resulting polyoxadiazole resin had an inherent viscosity of 2.3 in 0.5% resin solution in 95% sulfuric acid at 30° C. diluted by adding 1,300 parts of 95% sulfuric acid at 80° acid, in which the concentration of the polyoxadiazole resin was 4% and that of sulfuric acid was 100%.

Into 250 parts of this solution was added 30 parts of diisopropyl sulfate and the resulting mixture was heated at 50° C. while being stirred for 3 hours. The reaction solution was poured into a large amount of water to precipitate slightly yellowish resin, which was washed thoroughly with water until sulfuric acid was removed, and then dried under vacuum at 90° C. to obtain an object product. Polyoxadiazole is generally insoluble in any organic solvent, but the resin obtained in this example was soluble in organic solvents, such as N-methylpyrrolidone, N,N-dimethylformamide, N,N-dimethylacetamide, dimethylsulfoxide, m-cresol, etc.

The inherent viscosity of 0.5% resin solution in N,N-dimethylformamide at 30° C. was 0.72.

When the infrared absorption spectrum of this resin film was measured, absorption bands of 3,260 cm.$^{-1}$ assigned to NH, 1,660 cm.$^{-1}$ assigned to Co, and 2,980 cm.$^{-1}$ assigned to $CH_3$ were observed, and absorption band of 960 and 1,610 cm.$^{-1}$ corresponding to oxadiazole unit decreased extremely.

EXAMPLE 2

166 parts of terephthalic acid, 26 parts of 4,4'-dicarboxydiphenyl ether and 160 parts of hydrazine sulfate were added to 5,500 parts of 30% $SO_3$ fuming sulfuric acid and the resulting mixture was stirred at room temperature. The reaction temperature was raised to 140° C. and the reaction was continued for 10 hours while this temperature was maintained. Then the reaction mixture was poured into a large amount of water to precipitate slightly yellowish resin, which was washed thoroughly with water until sulfuric acid was removed. And the resin obtained above was dried in an air oven at a temperature of 120° C. The resulting resin, polyoxadiazole, had an inherent viscosity of 1.3 in 0.5% resin solution in 95% sulfuric acid at 30° C.

17 parts of this polyoxadiazole resin, 250 parts of 90% sulfuric acid and 30 parts of mono isopropyl sulfate were charged into a reaction vessel and reacted while being stirred at 70° C. for 5 hours. Then the reaction mixture was poured again into a large amount of water and treated in the same manner as described in Example 1 to obtain a resin which was soluble in m-cresol and had an inherent viscosity of 0.35 in 0.5% resin solution in N-methylpyrrolidone.

EXAMPLE 3

To 200 parts of the solution of polyoxadiazole in 100% sulfuric acid used in Example 1 was added 5 parts of isopropanol to obtain a homogeneous solution while the solution was cooled. The resulting solution was heated at 50° C. for 3 hours while being stirred, and then treated in the same manner as described in Example 1 to obtain a dried resin, which was soluble in cresol, N-methylpyrrolidone, N,N-dimethylacetamide, N,N-dimethylformamide and the like, and had an inherent viscosity of 0.82 in 0.5% resin solution in N-methylpyrrolidone at 30° C.

Cresol solution containing 20% of this resin was spread on a hard-chromium plated plate, which had been mirror finished, and dried at 160° C. for 10 minutes, after which a film having a thickness of $25\mu$ was peeled off. The thus obtained film was dried at 200° C. for 1 hour while being given two axial drawing of 1.2 times to obtain a light yellow transparent film which had a tensile strength of 1,200 kg./cm.$^2$, an elongation of 6% to original length, a dielectric constant of 3.2 (60 c.p.s.), a volumetric resistivity of more than $16^{16}$ $\Omega$cm. and a dielectric strength of 240 v./mm., and it could be used for a long period of time at 220° C.

EXAMPLE 4

8 parts of propylene were added to 200 parts of 4% polyoxadiazole solution in 100% sulfuric acid used in Example 1 under pressure and absorbed therein. The resuling mixture was reacted in the same manner as described in Example 1 to obtain a solution of poly(N-isopropylhydrazide).

This resin was soluble in cresol, N-methylpyrrolidone, N,N-dimethylformamide, N,N-dimethylacetamide, and had an inherent viscosity of 0.81 in 0.5% resin solution in N-methylpyrrolidone at 30° C.

15% solution of this resin in a mixed solvent of cresol and solvent naphtha (mixture ratio 4:1) was baked on copper wire of 1 mm. diameter in 6 m-long furnace at 280° C. 6 times to obtain a film having a thickness of $50\mu$, whereby insulated electric wire was obtained, the properties of which are as follows:

Dielectric strength: 12.4 kv.
Abrasion scrape resistance (load of 700 g., NEMA Standard): 85 times
Heat aging test:
    (280° C.×24 hours in air): wrap 2X OK
    (250° C.×10 days in air): dielectric strength 11 kv.
Heat shock resistance (300° C.×1 hour): wrap 1X OK
Chemical resistance (room temperature×48 hrs.): 5% NaOH aqueous solution, no change; 30% $H_2SO_4$ aqueous solution, no change.

EXAMPLE 5

To 1,000 parts of the solution dissolved 4% of polyoxadiazole in 100% sulfuric acid used in Example 1 was added the solution consisting of 28 parts of diisopropyl ether and 100 parts of 98% sulfuric acid to obtain a homogeneous solution. The resulting solution was reacted at 20° C. while being stirred for 4 hours to obtain light brown resin by the same treatment as described in Example 1.

This resin was soluble in cresol, N-methylpyrrolidone, N,N-dimethylacetamide and N,N-dimethylformamide and the inherent viscosity of 0.5% resin solution in N-methylpyrrolidone at 30° C. was 1.3.

EXAMPLE 6

300 parts of isophthalic acid dihydrazide and 249 parts of terephthalic acid were dissolved in 6,780 parts of 30% $SO_3$ fuming sulfuric acid, reacted at 140° C. for 3 hours, and cooled. 1,540 parts of 70% sulfuric acid for dilution and then 270 parts of n-propanol were added thereto, and the resulting mixture was reacted at 30° C. for 2 hours. The reaction mixture was treated in the same manner as described in Example 1 to obtain a resin having an inherent viscosity of 0.80 in 0.5% resin solution in m-cresol at 30° C.

100 parts of the thus obtained resin could be dissolved in a mixed solvent composed of 300 parts of cresylic acid and 100 parts of solvent naphtha to obtain a solution of the resin. The solution was coated on a glass plate and then heated at 150° C. for 30 minutes and further at 200° C. for 1 hour to obtain a transparent film having a thickness of about $25\mu$, the tensile strength, the elongation at break and the Young's modulus of which were 970 kg./cm.$^2$, 5% and 350 kg./cm.$^2$ respectively.

Even though the above mentioned film was heated at 180° C. for 1,000 hours in the air, no change was noted so that this film was excellent in heat resistance.

This film was heated at 300° C. for 1 hour, it became insoluble in cresol. Infrared spectrum of thus treated film showed that poly(n-propylhydrazide) was cyclized by heating into oxadiazole ring, namely, the absorption of 2,960 cm.$^{-1}$ assigned to $CH_3$, 3,260 cm.$^{-1}$ assigned to NH, and 1,660 cm.$^{-1}$ assigned to Co decreased extremely or disappeared and absorption of 960 cm.$^{-1}$ corresponding to oxadiazole ring increased.

Thus heat treated film was converted to heat-resistant polyoxadiazole.

It had a thickness of about $23\mu$, the tensile strength of 1,400 kg./cm.$^2$, elongation at break of 3% and the Young's modulus of 1,800 kg./cm.$^2$. Even though the above mentioned film was heated at 230° C. for 1,000 hours in the air, no change was noted so that this film was more excellent in heat resistance.

EXAMPLE 7

40 parts of metaphenylenebistetrazole and 38 parts of terephthaloyl chloride were added to a mixed solvent consisting of 800 parts of hexamethylphosphoramide and 30 parts of pyridine and the resulting mixture was stirred at room temperature for 2 days and then poured into water to obtain white precipitate. This precipitate was washed thoroughly with water and dried to obtain polyoxadiazole having an inherent viscosity of 0.35 in 0.5% resin solution in 95% sulfuric acid at 30° C.

8 parts of this polyoxadiazole was dissolved in 192 parts of 95% sulfuric acid and then reacted with 10 parts of isopropanol at 70° C. for 1 hour while being stirred. After the reaction completed the resulting mixture was treated in the same manner as described in Example 1. The infrared absorption spectrum of the resulting resin was very similar to that of the resin obtained in Example 1 and the formation of N-isopropylhydrazide unit was confirmed. The inherent viscosity of the resin was 0.3 in N,N-dimethylacetamide at 30° C.

EXAMPLE 8

95 parts of terephthalic acid, 285 parts of isophthalic acid, 314 parts of hydrazine sulfate and 2,050 parts of 40% $SO_3$ fuming sulfuric acid (109% $H_2SO_4$) were reacted at 130° C. for 5 hours while being stirred in a reaction vessel. Then the reaction solution was poured into a large amount of ice-water mixture, washed with water thoroughly and dried at 90° C. in vacuum to obtain polyoxadiazole resin having an inherent viscosity of 3.1 in 0.5% resin solution in 95% sulfuric acid at 30° C.

Thus obtained polyoxadiazole resin was insoluble in organic solvents. 10 parts of the resin and 240 parts of 100% sulfuric acid were charged into a vessel and mixed, while being stirred, into a homogeneous solution. Into this solution was added 11.7 parts of isopropyl chloride gradually while stirring is continued. The solution changed from heterogeneous at the beginning of reaction to homogeneous after reaction for 5 hours at room temperature. Then this solution was poured into a large amount of water, washed and dried in the same manner as described in Example 1.

This resin was soluble in N,N-dimethylformamide, cresol and N-methylpyrrolidone, etc., had an inherent viscosity of 0.52 in 0.5% resin solution in N-methylpyrrolidone at 30° C., and was confirmed by infrared absorption spectrum that N-isopropylhydrazide unit is formed.

EXAMPLE 9

47 parts of 2,2'-bis(4-carboxyphenyl) 5,5'-bibenzimidazole and 14 parts of hydrazine sulfate and 2,800 parts of 116% polyphosphoric acid (containing 83.4% $P_2O_5$) were charged into a reaction vessel and reacted while being stirred at 150° C. for 3 hours and further at 190° C. for 3 hours. The reaction solution became gradually viscous and finally extremely viscous solution. This reaction solution was poured into a large amount of ice-water to precipitate the resinous product, washed thoroughly with diluted aqueous sodium carbonate solution and water and dried at 90° C. under vacuum to obtain a yellowish resin. Inherent viscosity of this resin was 2.6 in 0.5% resin solution in 95% sulfuric acid at 30° C. From infrared spectrum of the resin by KBr method, the resin had absorption of 960 cm.$^{-1}$ corresponding to oxadiazole ring and 1,630 cm.$^{-1}$ corresponding to benzimidazole ring, therefore this resin was copolymeric resin consisting of oxadiazole and benzimidazole structural unit.

45.2 parts of thus obtained resin and 18 parts of isopropanol and 800 parts of 100% sulfuric acid were charged into a vessel and reacted at 70° C. for 3 hours and then reaction mixture was treated in the same manner as described in Example 1 to obtain light yellow resin.

This resin was soluble in N,N-dimethylacetamide, m-cresol and N-methylpyrrolidone and had an inherent viscosity of 0.92 in 0.5% resin solution in N-methyl-pyrrolidone at 30° C.

The 15% solution of this resin in cresylic acid was spread on a glass plate and dried at 180° C. for one and a half hours and peeled off to obtain transparent and light brown film. This film was confirmed by intrared spectrum to have no absorption of 960 cm.$^{-1}$ assigned to oxadiazole and to have N-isopropylhydrazide structural units corresponding to CO, NH and $CH_3$ as described in Example 1. This film was treated by heating at 280° C. for 2 hours and was measured by infrared absorption spectrum to find the structural change. After the heat treatment N-isopropylhydrazide unit disappeared and an oxadiazole unit generated.

EXAMPLE 10

To 200 parts of 4% polyoxadiazole resin solution in 100% sulfuric acid obtained in Example 1 was added 20 parts of ethyl sulfate.

The resulting solution was reacted at 50° C. for 1 hour while being stirred to obtain a solution of poly(N-ethylhydrazide) having an inherent viscosity of 0.49 in 0.5% resin solution in N-methylpyrrolidone at 30° C. The solution was poured into a large amount of water and the resin was separated from sulfuric acid. Thus obtained resin was dissolved in N,N-dimethylformamide to obtain 15% solution.

The resin solution was coated on a copper foil and dried at 100° C. for 1 hour. The coated copper foil was pressed with a phenol-formaldehyde resin laminate having a thickness of 1 cm. at 160° C. under a pressure of 50 kg./cm.$^2$. After heating and pressing for about 1 hour, the temperature and the pressure were gradually lowered to room temperature and atmospheric pressure to obtain a phenol-formaldehyde resin laminate with copper foil, which had an excellent peeling strength of 2.6 kg./cm.$^2$ between the copper foil and the phenol-formaldehyde resin laminate.

EXAMPLE 11

Propylene was absorbed while being cooled into 80% sulfuric acid in a glass autoclave and then the solution came to contain 21% propylene.

280 parts of the solution of polyoxadiazole in sulfuric acid used in Example 1 and 20 parts of the above obtained propylene solution were poured into a reaction vessel and the mixture was reacted for about 5 hours at 50° C. until homogeneous solution was obtained. Then the reaction mixture was treated in the same manner as described in Example 1 to obtain N-isopropylhydrazide unit containing polymer having an inherent viscosity of 0.07 in 95% sulfuric acid at 30° C. Infrared absorption spectrum of the polymer showed the absorption corresponding to oxadiazole and N-isopropylhydrazide. Therefore, this resin was the copolymeric resin consisting of oxadiazole and N-isopropylhydrazide structural units.

This resin was insoluble but swollen in m-cresol, N,N-dimethylformamide, N,N-dimethylacetamide, N-methylpyrrolidone, etc., and softened at 318° C., although polyoxadiazole had no softening point.

A part of this resin was heated at 310° C. in a stream of nitrogen gas for 2 hours, thereby the resin converted into oxadiazole resin with 11% decrease in weight. This weight loss showed the original resin structure being 29% of N-isopropylhydrazide and 71% of oxadiazole.

The resin first obtained in this example was pulverized into 200–300 mesh of fine powder and molded by a heat press process at 320° C. under 120 kg./cm.$^2$ for 3 hours into a block 5 mm. thick, 20 mm. wide and 100 mm. long. A resinous block was unaffected by organic solvents because it was converted into oxadiazole resin.

This article had a specific gravity of 1.3, a tensile strength of 870 kg./cm.$^2$ an elongation at break of 6%, a flexural modulus of 35,000 kg./cm.$^2$ and Rockwell hardness of H 73–75 and did not show any change of properties after heating at 230° C. in air for 1,000 hours.

EXAMPLE 12

194 parts of isophthalic acid dihydrazide, 205 parts of terephthaloyl chloride were stirred vigorously in 1,600 parts of hexamethylphosphoramide for 24 hours while being kept at a temperature lower than 15° C. to obtain a viscous milk-white solution, which was poured into a large amount of water, whereby resin was precipitated. The resulting resin was washed with water thoroughly and then dried at 100° C. under vacuum to obtain polyhydrazide resin having an inherent viscosity of 1.6 in 0.5% resin solution in dimethylsulfoxide at 30° C. This resin was heated at 280° C. under vacuum for 16 hours to effect cyclodehydration and converted into polyoxadiazole.

20 parts of the resin was dissolved in 100% sulfuric acid to obtain the solution containing 10% of polyoxadiazole. Then, 20 parts of n-propanol was added to the solution and reaction was proceeded at 60° C. for 2 hours. The reaction mixture was poured into a large amount of water, washed with water to make it free from sulfuric acid, further washed with ethanol and dried under vacuum at 100° C.

Thus obtained resin was slightly yellowish resin soluble in N,N-dimethylformamide, m-cresol, N,N-dimethylacetamide, N-methylpyrrolidone, etc. and an inherent viscosity of 0.45 in 0.5% resin solution in N,N-dimethylformamide at 30° C.

The 15% solution of this resin in cresol was coated on an aluminium plate having a thickness of 1 mm. and a copper foil having a thickness of 0.1 mm., and then baked at 150° C. for 1 hour so as to obtain a baked layer having a thickness of 25$\mu$. The coated faces of said aluminium plate and said copper foil were put together and subjected to press under a pressure of 50 kg./cm.$^2$ at 180° C. for 15 minutes, and then heated under a pressure of 70 kg./cm.$^2$ at 290° C. for 30 minutes. Then the pressure and the temperature were lowered to room temperature and atmospheric pressure respectively to obtain a bonded metal plate.

The thus obtained metal plate had a peeling strength of 3.6 kg./cm.$^2$ between the aluminium plate and the copper foil, which did not decrease at all even when the metal plate was exposed to hot air at 200° C. for 1,000 hours.

EXAMPLE 13

The powder of the resin obtained in Example 1, 300 mesh or finer, was molded by a heat press at 220° C. under 70 kg./cm.$^2$ into a sheet having a thickness of 4 mm. The resulting sheet was heated in an autoclave under 100 kg./cm.$^2$ at a temperature of 330° C. for 20 minutes and then the temperature was decreased to 220° C., thereafter the pressure was decreased to atmospheric pressure and the temperature was gradually reduced to ambient temperature in about 1 hour to obtain a foamed sheet expanded 7 times the original volume.

The thus obtained sheet of the resin was insoluble in organic solvents, and even when it was heated at 260° C. for 100 hours it did not change its shape and weight at all, so that it had an extremely high heat resistance.

EXAMPLE 14

On an aluminium plate having a thickness of 1.0 mm. was coated 15% solution of the resin obtained in Example 1 in N,N-dimethylformamide so as to form a resin layer having a thickness of 50μ. Then the resin layers of said two aluminium plates were put together. The assembly was heated and pressed by a hot press at 220° C. under a pressure of 65 kg./cm.$^2$ to form an aluminium laminate. The resulting aluminium laminate was heated in a furnace at 330° C. for 20 seconds under atmospheric pressure, whereby a foamed layer composed of fine cells and expanded 10 times the original volume was formed between the two aluminium plates.

Even though the resulting foamed layer of resin was heated at 250° C. for 1,000 hours, it was neither deformed nor deteriorated.

EXAMPLE 15

A N,N-dimethylformamide solution containing 12% of the resin obtained in Example 9 was spread on a Teflon plate and heated at 100° C. for 1 hour to obtain a transparent film having a thickness of 30μ.

The thus obtained film was interposed between the surfaces (100 cm.$^2$) of two aluminium plates to be bonded, which had been previously treated with alkali. The assembly was heated at 160° C. for 1 hour under a pressure of 200 kg./cm.$^2$.

Then the temperature was lowered gradually to room temperature, after which the pressure was lowered to atmospheric pressure to obtain a laminate of the aluminium plates. The bonded portion of the aluminium laminate had a shearing strength of 216 kg./cm.$^2$.

After another aluminium laminate produced in the same process was left to stand for one month in air at 180° C., the shearing strength at the bonded portion was 215 kg./cm.$^2$, which was not substantially decreased.

EXAMPLE 16

15% solution of the resin obtained in Example 5 in a mixed solvent of N,N-dimethylacetamide/N-methylpyrrolidone at a mixing ratio of 1/1 was extruded into a coagulant bath containing water and ethylene glycol through a nozzle having 15 holes, the diameter of each hole being 75μ, and the resulting filamentary resin was washed with hot water and dried at 210° C. while being drawn 3 times its original length and after that treatment was heated again at 300° C. for 1 minute.

The thus obtained filament had a tenacity of 4.5 g./denier and an elongation at break of 15%. The filament had no change in the tenacity and elongation at break, even when heated at 220° C. for 1,000 hours in air.

EXAMPLE 17

A glass cloth was impregnated with 18% solution of the resin obtained in Example 8 in cresol, and the impregnated glass cloth was heated at 210° C. for 1 hour and then at 320° C. for 15 minutes.

The resulting impregnated glass cloth containing 31.6% of the resin had such electric properties as surface resistance of $10^{15}$ Ωcm., dielectric constant of 4.8, arc-proof property of 192 seconds and dielectric strength of 46 kv.

What is claimed is:

1. A novel high temperature resistant resin consisting essentially of N-alkylhydrazide structure units having the general formula $$\left\{ \mathrm{Ar-\underset{\underset{O}{\|}}{C}-\underset{\underset{R}{|}}{N}-NH-\underset{\underset{O}{\|}}{C}} \right\}$$

wherein Ar represents a bivalent aromatic radical and R represents an alkyl group having 2 to 4 carbon atoms, and having an inherent viscosity of more than 0.3 in 0.5% resin solution in N-methylpyrrolidone at 30° C. or more than 0.01 in 0.5% resin solution in 95% concentrated sulfuric acid at 30° C.

2. The resin as claimed in claim 1, wherein said alkyl group in N-alkylhydrazide structural unit has 3 carbon atoms.

3. The resin as claimed in claim 1, wherein said bivalent aromatic residue is para-phenylene or meta-phenylene.

4. The resin as claimed in claim 1, which is poly (N-alkylhydrazide) wherein the alkyl group contains from 2 to 4 carbon atoms.

5. The resin as claimed in claim 4, wherein said poly (N-alkylhydrazide) is poly (N-n-propylhydrazide) or poly N-iso-propylhydrazide).

6. The resin as claimed in claim 1, which is a copolymeric resin consisting of N-alkylhydrazide structural units having the general formula $$\left\{ \mathrm{Ar-\underset{\underset{O}{\|}}{C}-\underset{\underset{R}{|}}{N}-NH-\underset{\underset{O}{\|}}{C}} \right\}$$

wherein Ar represents a bivalent aromatic radical and R represents an alkyl group having 2 to 4 carbon atoms, and oxadiazole structural units having the general formula $$\left\{ \mathrm{AR} \underset{O}{\overset{N-N}{\diagdown\!\!\!\diagup}} \right\}$$

wherein Ar represents a bivalent aromatic radical the proportion of said N-alkylhydrazide unit being more than 10 mol percent of said resin with the remaining units being said oxadiazole units.

7. The copolymeric resin as claimed in claim 6, wherein said alkyl group in said N-alkylhydrazide structural units has 3 carbon atoms.

8. The copolymeric resin as claimed in claim 6, which consists of more than 10 mol percent to less than 40 mol percent of N-alkylhydrazide structural units and is fusible and insoluble in organic solvents.

9. The copolymeric resin as claimed in claim 6, which consists of not less than 40 mol percent of N-alkylhydrazide structural units and is fusible and soluble in organic solvents.

10. A method of producing novel high temperature resistant resin consisting essentially of N-alkylhydrazide structural unit having the general formula $$\left\{ \mathrm{Ar-\underset{\underset{O}{\|}}{C}-\underset{\underset{R}{|}}{N}-NH-\underset{\underset{O}{\|}}{C}} \right\}$$

wherein Ar is a bivalent aromatic radical and R is an alkyl group having 2 to 4 carbon atoms, which comprises reacting polyoxadiazole having the general formula

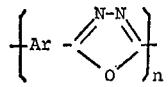

wherein Ar has the same meaning as described above and n represents a polymerization degree expressed by integer, corresponding to an inherent viscosity of more than 0.3 in 0.5% resin solution in 95% concentrated sulfuric acid at 30° C. with mono- or dialkyl sulfate whose alkyl group has 2 to 4 carbon atoms in the presence of a concentrated sulfuric acid as a reaction solvent.

11. The method as claimed in claim 10, wherein the reaction is carried out at a temperature of 10 to 80° C.

12. The method as claimed in claim 10, wherein said concentrated sulfuric acid of the reaction solvent has a concentration of 80 to about 100% by weight.

13. The method as claimed in claim 10, wherein said mono- or dialkyl sulfate is the sulfate whose alkyl group has 3 carbon atoms.

14. The method as claimed in claim 10, wherein a reacted mixture consisting of polyoxadiazole and fuming sulfuric acid with or without being diluted is used.

15. The method as claimed in claim 10, wherein the reaction is carried out by adding said mono- or dialkyl sulfate itself direct to the reaction system.

16. The method as claimed in claim 10, wherein the reaction is carried out by dissolving said polyoxadiazole in said concentrated sulfuric acid of the reaction solvent and then adding a substance which can react with the concentrated sulfuric acid to form the said alkyl sulfate.

17. The method as claimed in claim 10, wherein the reaction is carried out by adding a substance, which can react with the concentrated sulfuric acid to form the said alkyl sulfates to the concentrated sulfuric acid to produce the said alkyl sulfates, and adding polyoxadiazole thereto.

18. The method as claimed in claim 6, wherein said substance, which can react with the concentrated sulfuric acid to form the said alkyl sulfates, is selected from the group consisting of n-propanol, iso-propanol, iso-propyl chloride, iso-propyl ether and propylene.

19. The method as claimed in claim 17, wherein said substance, which can react with the concentrated sulfuric acid to form the said alkyl sulfates, is selected from the group consisting of n-propanol, iso-propanol, iso-propyl chloride, iso-propyl ether and propylene.

20. A self-supporting film made of the resin claimed in claim 1.

21. A filament of the resin claimed in claim 1.

References Cited
UNITED STATES PATENTS

| | | | |
|---|---|---|---|
| 3,130,182 | 4/1964 | Frazer | 260—78 |
| 3,238,183 | 3/1966 | Frazer | 260—78 |
| 3,275,608 | 9/1966 | Montgomery et al. | 260—78 |

HAROLD D. ANDERSON, Primary Examiner

U.S. Cl. X.R.

117—161 P; 161—182, 227; 260—2.5 R, 2.5 N, 470 Z, 30.2, 30.8 R, 30.8 DS, 32.6 N, 33.4 R, 78 TF, 78.4 R